May 11, 1965

P. M. HUNT 3,183,309

TELEPHONE ISOLATION DEVICE

Filed Aug. 8, 1960

P. M. HUNT
INVENTOR,

BY Homer R. Montague
ATT'Y.

United States Patent Office 3,183,309
Patented May 11, 1965

3,183,309

TELEPHONE ISOLATION DEVICE

Philip M. Hunt, Falls Church, Va., assignor to Orbit Industries, Inc., Vienna, Va., a corporation of Puerto Rico
Filed Aug. 8, 1960, Ser. No. 48,248
2 Claims. (Cl. 179—35)

This invention deals with telephone system and analogous wired communication networks, and has for its principal object the provision of means and devices for accomplishing the isolation of the mutual capacitances of plural lines or stubs connected at various points along a single conductive path, line, or channel.

Conventional telephone systems employ both direct and alternating currents for their operation. Thus, alternating current of a considerable voltage is usually employed for the call signals (ringers) of stations connected to the line, and often the frequency employed is selected to effect selective ringing at a given one of several stations connected to a party line. It is therefore necessary to maintain all the stations constantly in a condition to receive such high potential A.C. signals. It is also necessary to maintain all the stations (except one which may have answered a call, or seized the line to initiate a call) isolated from the line, because talking currents, interrupted D.C. dialing pulses, and the like would otherwise be shunted from the line and dissipated. Conventionally, the ringer circuit at each station is connected across the line through a hook switch and a capacitor which has a high impedance to D.C. and dial pulse signals (of either polarity), but a low impedance to ringing frequency alternating currents. The D.C. path and the voice frequency path through the telephone instrument, and/or any induction coil employed, is normally interrupted by the hook switch of the instrument, thus achieving nominal D.C. and voice frequency A.C. isolation of all unused instruments from the line.

In many telephone systems, as many as four or more "party" telephone instruments may be bridged across a single line, so that while the system described above achieves the desired isolation as a theoretical proposition, any imperfections in the equipment or excessive capacitance in the subscriber tap or drop wire may add up to a disastrously high aggregate leakage of talking currents, and consequent deterioration of the transmission quality.

It is accordingly a principal object of the invention to provide a simple and inexpensive isolation device for use between a telephone line and each connected subscriber tap or drop wire, such that the capacitive shunting effect of each such tap in the "on-hook" condition can be reduced by several orders of magnitude, without introducing any appreciable attenuation when the tap or instrument is in the "off-hook" condition.

A further object of the invention is to provide an isolation device as above described, which will effectively remove the effects of the unavoidable shunt capacitance of telephone taps or stubs whenever they are not in actual use, thereby eliminating its attenuating effect on line signals; but without in any way interfering with the passage of A.C. ringing currents to each such tap or stub, or with the passage of D.C. talking or dialing signals to or from the connected telephone.

Still another object of the invention is to provide an isolation device as above described which will remain operative despite the existence of relatively small values of unavoidable D.C. leakage current through a tap or stub which is nominally in the open-circuit or "on-hook" condition.

The invention accomplishes the above aims by providing, between the telephone line and each tap or drop wire line, an isolation device comprising a four-terminal network including in each line conductor a pair of reversely-poled voltage-sensitive rectifier or diode units whose conduction characteristics exhibit a relatively sharp drop in conductivity for applied signals of amplitudes less than a specified value which is less than that due to the line voltages operating through the unavoidable shunt capacitance and leakage resistance of the tap line or stub. Since the leakage currents due to shunt resistance in the tap line or stub could effectively bias these units into their higher-conductivity state, the invention further provides a shunt inductance across each pair of diode units, of proper value to maintain the proportion of leakage current drop appearing across such pair at a value insufficient to raise them to such higher-conductivity condition.

The invention itself will best be understood by referring now to the following detailed specification of a preferred embodiment thereof, taken in connection with the accompanying drawings, in which.

Figure 1:
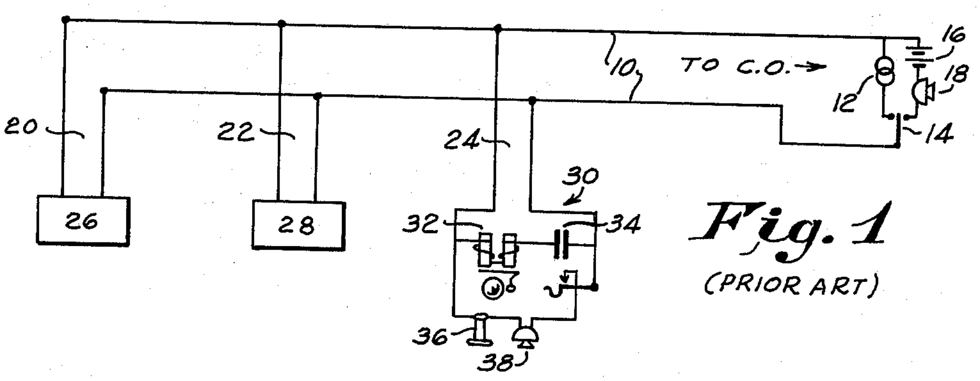
FIG. 1 is a schematic diagram of a telephone line having a plurality of drop line or tapped subscriber stations bridged thereon, the equivalent circuit of one such station being shown.

Referring now to FIG. 1 of the drawings, numeral 10 represents a conventional telephone line connected at one end to conventional central office (or other remote terminal) equipment shown in simplified form as including a ringing frequency generator 12 connectable to line 10 in one position of switch 14. Generator 12 will usually produce a ringing voltage in the range of 50–180 volts, at a frequency of from 20 to 66 cycles per second.

The central office equipment will also include a talking circuit connectable across line 10 in a second position of switch 14, and here shown as including a talking battery 16 (or equivalent direct current source) and a transmitter (microphone) 18. A simple series circuit, without hybrid coils and like refinements, is illustrated as functionally typical of all such arrangements, and for simplicity and clarity of illustration.

A telephone line 10 will, in the cases of interest respecting this invention be shunted at various points by different subscriber tap lines such as at 20, 22 and 24. The lengths of such "party" lines may range from a hundred feet or less up to several miles, particularly on farm lines. Regardless of the quality of line 10, the tap or drop lines 20, 22 and so on invariably include unavoidable shunt capacitance between their conductors, as well as unavoidable leakage conductance due to imperfect insulation. The shunt capacitance of all such tap lines, which is manifested even in their "on-hook" condition, is effectively in parallel with any one tap line which is in use, and hence in its "off-hook" condition.

Considering the FIG. 1 diagram, lines 20 and 22 will terminate in typical subscriber equipment indicated at 26 and 28, and line 24 will terminate in similar equipment 30 shown in more detail as including a ringer (bell) 32 and its series capacitor 34 adapted to pass A.C. ringing signals to the ringer. Equipment 30 also includes usual voice equipment represented in simplified fashion by receiver 36, microphone 38 and of course the usual hook switch 40 which closes the circuit from line 24 through these elements only when the instrument is in use.

Isolating capacitor 34 can be, and is, chosen of such value that its shunting effect (in combination with the series inductance represented by the ringer coil windings)

on voice-frequency signals passing over line 10 (for example) is trivial, or at least fully tolerable; and in the case of the party line system shown, such that the shunting effect of the aggregate of the ringer-circuit capacitances of all the tap-line instruments not in use will not degrade the sound level at the in-use instrument more than a permissible amount. This degradation, however, imposes a definite limitation on the number of tap subscribers who can be served by a given main line 10. Moreover, service to any chosen tap subscriber is additionally degraded by the additional shunt capacitance inherently associated with all of the tap lines 20, 22, 24 and so on, same being additive in their shunt-attenuation effects.

In the case of increasingly popular buried wire taps, the total connected shunt capacitance attributable to the tap line conductors themselves may amount to as much as one microfarad, which degrades telephone transmission to an unacceptable degree.

Figure 2:
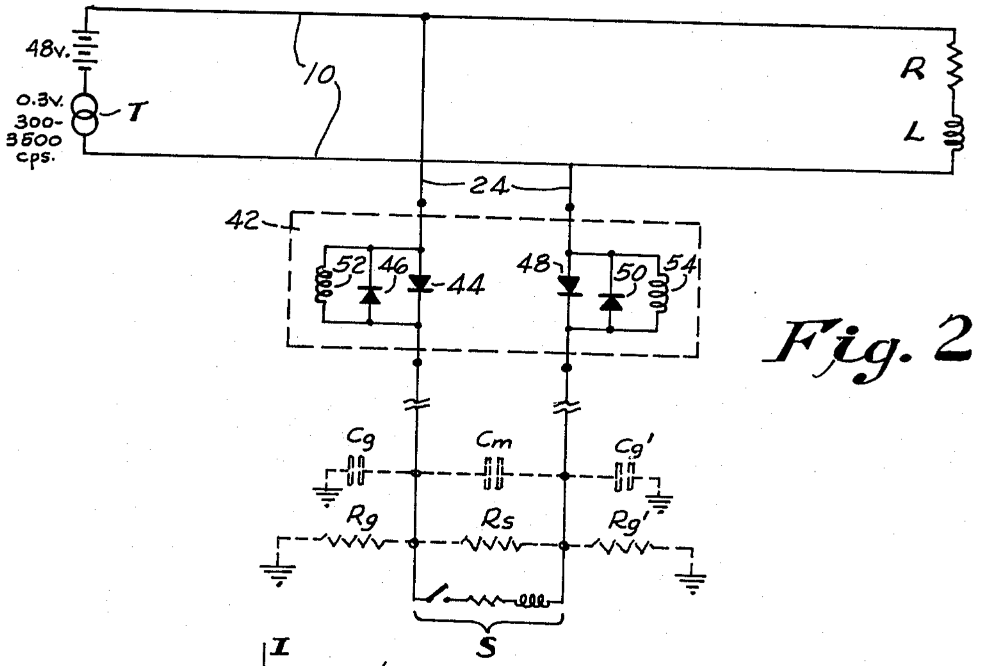
FIG. 2 is a schematic diagram of a portion of the same line, with a more detailed showing of a subscriber tap line connected thereto through the isolation device of this invention.

The present invention permits effective isolation from line 10 of the shunt capacitance of all of those tap lines which are momentarily not in use, and hence isolates the in-use line signals from that source of attenuation and speech degradation. Referring now to FIGURE 2 of the drawings, the central office talking equipment is illustrated by a conventional 48-volt talking battery in series with a voice transmitter T and connected to line 10. Here only one tap connection (24) is shown, the connected station being out of use (on hook), and R and L designating the D.C. path through a remote in-use tap line. The circuitry shown for line 24 is intended as typical of any other out-of-use tap lines which are also connected to line 10.

The invention provides, adjacent the tap point at 10, an isolation unit 42 comprising a four-terminal network (more specifically, two two-terminal networks) providing in each conductor a pair of oppositely-poled nonlinear unidirectional elements connected in parallel. Thus, elements 44 and 46 are so connected in one conductor of line 24, and elements 48 and 50 in the other conductor.

Figure 3:
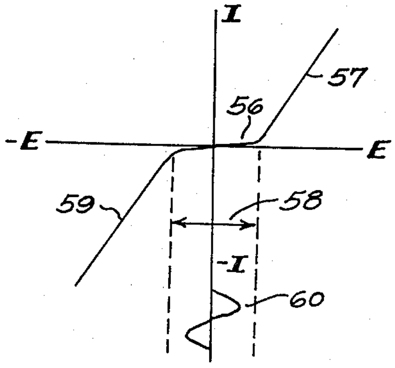
FIG. 3 is a graphical illustration of the voltage-current characteristic of a pair of the diode units employed in the invention.

Elements 44, 46, 48 and 50 are carefully chosen diode rectifier devices such as silicon diodes having as nearly as possible identical voltage-current characteristics such as shown in the first quadrant of the graph of FIG. 3. Each such characteristic thus includes a toe region 56 corresponidng to a high value of resistance, connected by a relatively sharp transition to a region 57 of relatively much lower resistance. The voltage value corresponding to the transition region is made to have a value equal to or slightly greater than the peak value of voice signals produced on line 10 by a single in-use tap line or subscriber instrument.

Since each conductor of line 24 is thus isolated from line 10, as respects voice signals such as 60 (on line 10), the attenuation due to line 24 is reduced to a negligible amount. The use of a reversely-poled parallel pair of diodes duplicates curve 56, 57 in the third quadrant of FIGURE 3, as at 59. Numeral 58 designates the peak-to-peak swing of applied voice signals for which such isolation is thus provided.

While it might appear that a single pair of such diode units in one conductor of line 24 would be adequate, considerations of line balance, commercial practice with respect to reverse-polarity talking battery, and the necessity for passing both half-cycles of ringing frequency, dictate the use of matched sets of such diodes in the respective conductors.

It is to be noted that the isolation provided by the described arrangement affects only the attenuating effect of the tap line shunt capacitance on the voice-frequency A.C. component of signals on line 10, since only this component "sees" that capacitance in the tap line in the absence of the isolation device. With the device installed as shown, only signal excursions on the main telephone line in excess of the value indicated at 58 of FIG. 3, typically 0.8 to 1.0 volt peak-to-peak, are attenuated by the effect of the connected tap line since the isolation device presents a high impedance path between the main telephone line and the tap line at lower signal levels. Conventional telephone talking signal levels are substantially lower than the 0.8 to 1.0 volt level referred to above, so that the attenuation thereof resulting from the isolated tap line will be negligible. Signals of greater magnitude, including talking battery current (e.g., when the tap line 24 is "in use"), dial pulses, ringing current, and the like, find free access to line 24 because they are effective in the highly conducting regions of the FIG. 3 characteristic. Thus, when line 24 is put into use by closure of the hook switch in the subscriber's instrument, the usual D.C. talking battery current flow biases the diodes to their conductive condition, and voice signals to and from that instrument are freely transmitted.

$C_m$ in FIG. 2 designates the "mutual" shunt capacitance of tap line 24, while $C_g$ and $C_g'$ designate the respective capacitances of the individual conductors to ground. Typical values are 0.091 and 0.02 mdf. per mile of tap line.

In any practical telephone plant, drop or tap lines will be found to conduct a small direct current (from the talking battery supply) even when in the on-hook condition, both between conductors and from either conductor to ground. This current causes the tap line to look like a resistance, perhaps of as low value as 10,000 ohms, and is due to leakage over imperfect insulation, moisture, dirt or like causes in and on tap wiring components such as the pedestal, splices, drop wire to the telephone instrument, protector equipment and the like. The equivalent resistances are indicated in FIG. 2 by $R_s$, $R_g$ and $R_g'$. Assuming a 10,000 ohm equivalent value for leakage, the line signal voltage is now shunted by the diodes in series with the 10,000 ohm resistive load $R_s$. However, one of the diodes may thus be biased to a conducting state by the central office 48-volt talking battery, and the small superimposed A.C. voice signal voltage would thereupon be gated through such conducting diode, and attenuated in the tap line circuitry, even though it is "on-hook" and at least theoretically unable to pass direct currents.

I have found that normal leakage resistance values of the order mentioned above may be tolerated (that is, prevented from gating any diode to its conductive state) by shunting each diode pair with an impedance such as 52, 54. The impedances are to have low D.C. resistance and a relatively high impedance at talking and ringing frequencies. The criterion to be met is that the IR drop across each impedance shall be less than the diode conduction bias voltage. An inductance having a low resistance is therefore preferably employed, although a pure resistance may be substituted if the tap leakage current is extremely small. Preferably, in the off-hook condition, the A.C. inpedance of the isolation device is of the order of 1 to 5 ohms, and the D.C. resistance is somewhat greater.

In FIG. 2, the distributed circuit components $C_g$ and $R_g$ (and their primed counterparts) will produce line unbalance unless the components of the isolation device (diodes and shunt impedances) are themselves well matched. Preservation of this balanced condition is desirable to maintain circuit quality over loops of varying lengths and composition, during both off-hook and on-hook conditions. That is, the individual bi-directional non-linear units formed by each diode pair should be as nearly identical in their characteristics as can be achieved.

While the invention has been described herein in considerable detail so that those skilled in the art can readily practice the same, it is to be understood that various modifications and alterations can be made without departing from the spirit of the invention. All such changes are considered to be included in the invention to the extent that they fall within the scope of the appended claims.

What is claimed is:

1. An isolation device for insertion between the conductors of a telephone line and a subscriber tap line, which tap line is characterized by unavoidable shunt capacitance and leakage resistance, comprising a four-terminal network providing individual paths from each telephone line conductor to a corresponding tap line conductor, each such path including a reversely-poled parallel-connected pair of non-linear rectifying elements individually characterized by substantially zero impedances for absolute values of applied voltage greater than the effective voice-frequency signals carried by said telephone line and a much higher impedance for absolute values of applied voltage less than such signals, and an inductive reactance element shunted across each such pair of rectifying elements.

2. An isolation device for insertion between the conductors of a telephone line and a subscriber tap line, which tap line is characterized by unavoidable shunt capacitance, comprising a four-terminal network providing individual paths from each telephone line conductor to a corresponding tap line conductor, each such path including a reversely-poled parallel-connected pair of non-linear rectifying elements individually and substantially identically characterized by substantially zero impedance for absolute values of applied voltage greater than the effective voice-frequency signals carried by said telephone line, and a much higher impedance for absolute values of applied voltage less than such signals; and a direct-current conductive impedance element shunted across each such pair of rectifying elements.

References Cited by the Examiner

UNITED STATES PATENTS

| | | | |
|---|---|---|---|
| 2,122,748 | 7/38 | Mayer | 307—88.5 |
| 2,186,242 | 1/40 | Halligan | 179—31 |
| 2,197,966 | 4/40 | Cox | 179—28 |
| 2,924,667 | 2/60 | Hochgraf | 179—35 |
| 2,964,650 | 12/60 | Radcliffe et al. | 307—88.5 |
| 3,073,908 | 1/63 | Hochgraf et al. | 179—35 |

ROBERT H. ROSE, *Primary Examiner.*

L. MILLER ANDRUS, THOMAS B. HABECKER, WILLIAM C. COOPER, *Examiners.*